(No Model.)

C. F. RITCHEL.
TOY JUMPING ANIMAL.

No. 280,330. Patented June 26, 1883.

WITNESSES:
Wm. A. Lowe
D. J. Morgan

INVENTOR
Chas. F. Ritchel
BY A. P. Thayer
ATTORNEY

UNITED STATES PATENT OFFICE.

CHARLES F. RITCHEL, OF BRIDGEPORT, CONNECTICUT, ASSIGNOR TO S. S. & G. D. TALLMAN, OF NEW YORK, N. Y.

TOY JUMPING ANIMAL.

SPECIFICATION forming part of Letters Patent No. 280,330, dated June 26, 1883.

Application filed March 21, 1883. (No model.)

*To all whom it may concern:*

Be it known that I, CHARLES F. RITCHEL, a citizen of the United States, and residing at Bridgeport, in the county of Fairfield and State of Connecticut, have invented new and useful Improvements in Toy Jumping Animals, of which the following is a specification.

My invention consists of a toy animal having spring mechanism contrived with the legs, whereby the animal may be posed in the drawn-back or recoiled position common with animals preparatory to springing or jumping forward, and the springs set thereby to be tripped and to cause the animal to jump forward by the force of the spring, as hereinafter described, reference being made to the accompanying drawings, in which—

Figure 1:
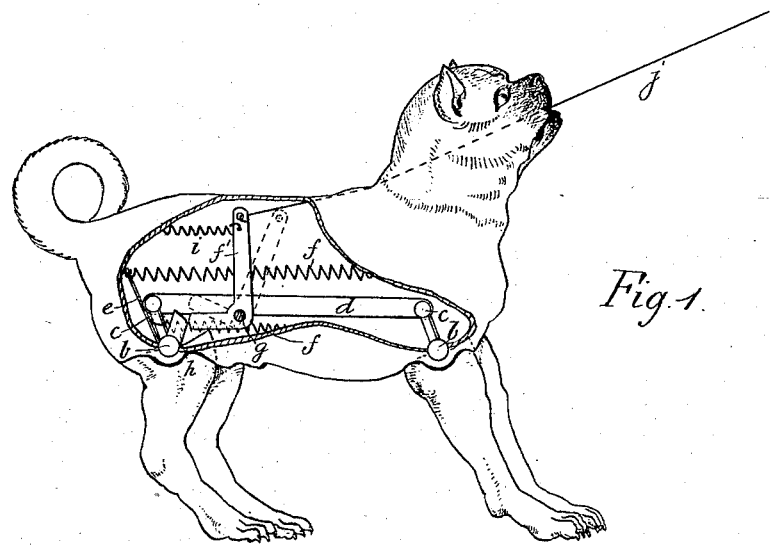
Figure 2:
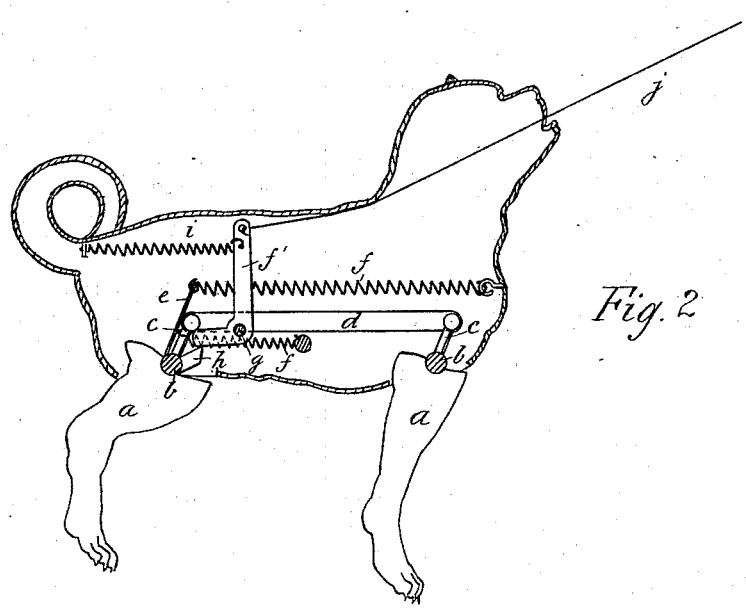

Figure 1 is a side elevation of a figure of a dog contrived according to my invention, a part of the side being broken out to show the mechanism and the dog being posed in recoil preparatory for the forward spring; and Fig. 2 is a sectional elevation, showing the positions of the parts after the jump. The legs $a$ are connected to pivots $b$, from which an arm, $c$, extends upward a suitable distance in the body for connecting the front and hind legs together by a suitable connecting-rod, $d$. To one of these arms $c$, and to another longer arm, $e$, attached to the hind pivot, if desired, I apply one or more coiled or other approved springs, $f$, suitably connected to the body, and so arranged for action that when free to act they will thrust the body forward from the position represented in Fig. 1 to that in Fig. 2, the floor being the fulcrum of the legs working as levers, by which the quick thrust of the springs under proper tension duly proportioned to the weight of the animal will cause it to jump from one position to another, especially if the fore legs be a little longer than the hind legs, to give greater rise to the fore part of the body, which I provide for.

A trip-lever or trigger, $f'$, is fixed on a pivot, $g$, and arranged with the short arm $h$ of the hind pivot for setting the animal preparatory to jumping with a spring, $i$, to cause the short arm of the trip-lever to drop below the end of arm $h$ when it swings back, and a string, $j$, extending out through the mouth of the animal, is the means which I prefer for tripping the spring $f$; but other setting and tripping mechanism may be employed, if preferred.

To set the animal in the recoiled position and extend the spring preparatory to jumping, it is to be placed on its feet on the floor and pushed back on the head until arm $h$ swings up clear of the end of the short arm of the trip-lever $f$, and the said short arm drops in front of the arm $h$. I do not limit myself to animal figures, but may apply the invention to baby and other figures.

What I claim, and desire to secure by Letters Patent, is—

1. The combination, in a spring mechanism for toy jumping animals, of the legs $a$, pivoted to the body at $b$ and connected together by arms $c$ and rod $d$, one or more springs connected to said arms, trip-lever $f$, setting-lever $h$, trip-lever spring $i$, and the trip-cord $j$, substantially as described.

2. In a toy jumping animal having a spring and a setting and tripping device for the spring combined with the legs, as herein described, for causing the animal to jump forward when the spring is tripped, the arrangement of the spring mechanism whereby the spring may be set by pressing the animal backward when standing on the legs, substantially as described.

In witness whereof I have hereunto signed my name in the presence of two subscribing witnesses.

CHARLES F. RITCHEL.

Witnesses:
EUGENE Y. ELIOT,
W. J. MORGAN.